MARY NICHOLSON.
Combined Beer and Water Coolers.

No. 154,709.  Patented Sept. 1, 1874.

Witnesses:
Harry C. Clark
M. Church

Inventor:
Mary Nicholson
By Hie & Ellsworth
Her Attorneys

UNITED STATES PATENT OFFICE.

MARY NICHOLSON, OF WESTERN PORT, MARYLAND.

IMPROVEMENT IN COMBINED BEER AND WATER COOLERS.

Specification forming part of Letters Patent No. 154,709, dated September 1, 1874; application filed July 14, 1874.

*To all whom it may concern:*

Be it known that I, MARY NICHOLSON, of Western Port, in the county of Alleghany and State of Maryland, have invented certain new and useful Improvements in Beer and Water Coolers; and I do hereby declare the following to be a full, clear, and exact description of the same, reference being had to the accompanying drawings forming part of this specification, in which—

Figure 1:
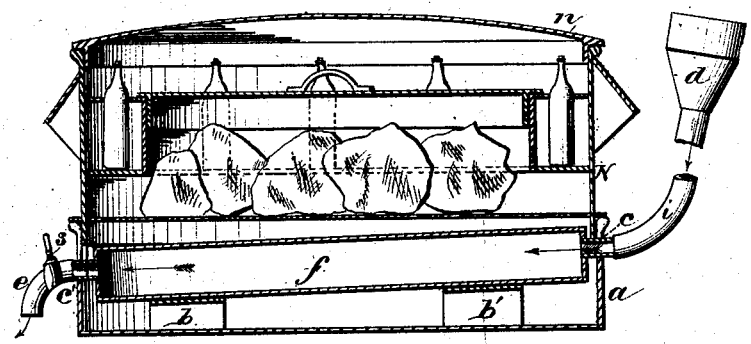
Figure 2:
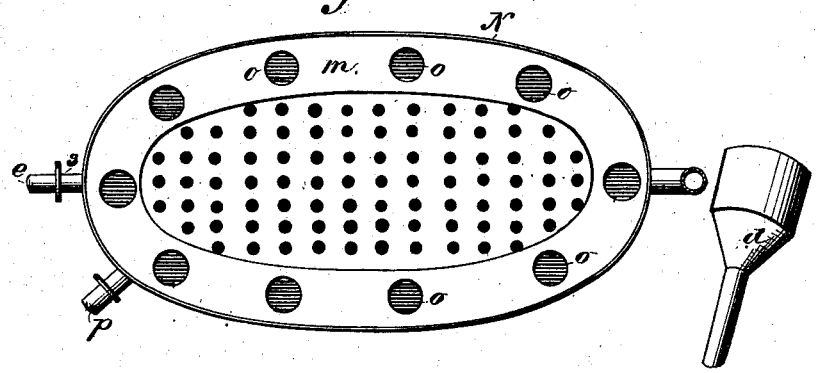
Figure 3:
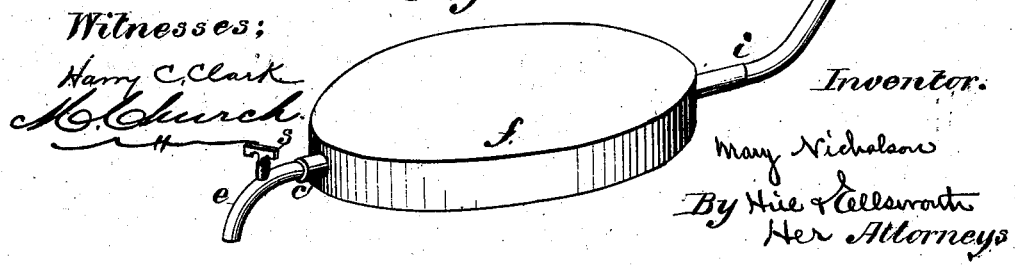

Figure 1 is a longitudinal section of my combined beer and water cooler. Fig. 2 is a top view of the ice-receptacle of the cooler, with the covers removed; and Fig. 3, a perspective view of the beer-receptacle and its attachments.

Similar letters of reference in the accompanying drawings denote the same parts.

The object of my invention is to provide a cooler for both beer, or other beverages, and water, the cold water being utilized in cooling the beer, while at the same time the beer or cold water can be drawn off for use when desired, the place of the latter being supplied by cold water from an ice-receptacle; and to these ends it consists in the employment of an inclined beer-receptacle, provided with induction and eduction pipes and surrounded by a suitable casing, leaving an open space entirely surrounding the beer-receptacle, for the reception of cold water, which passes through perforations in the bottom of an ice-receptacle situated immediately over the beer-receptacle, the outer casing surrounding the latter and the eduction-pipe being also provided with cocks, by means of which cold water or beer may be drawn when desired.

In the accompanying drawing, $a$ is a vessel provided with projections $b\ b'$ on the upper face of its bottom, projection $b'$ being higher than the projection $b$, so as to give a slight inclination to the beer-receptacle $f$, which rests on the projections or seats $b\ b'$. The beer-receptacle $f$ is of smaller dimensions than the vessel $a$, so as to leave a water-space entirely around the beer-receptacle, which is provided at one end with an induction-pipe, $i$, enlarged or funnel-shaped at its upper termination, for introducing beer or other beverage to be cooled, into the receptacle $f$. The opposite end of the receptacle $f$ is provided with an eduction-pipe, $e$, and cock $s$, for drawing the cooled beer when desired. The beer-receptacle $f$ is inclined to cause a more rapid flow of the liquid contained therein. $c\ c'$ are slots made in the end of the vessel $a$ for the passage of the induction and eduction pipes, and $p$ is a curved pipe in the vessel $a$, provided with a cock. N is an ice-receptacle, provided with a perforated bottom and a flange below the latter, which fits into the top of the vessel $a$. $m$ is a chamber, entirely surrounding the inner part of the ice-receptacle, leaving a large central space concentric with the outer casing of the ice-receptacle for the introduction of ice, which is closed by a suitable cover. The dimensions of the chamber $m$ are less than those of the ice-receptacle, so that spaces are left between the top and bottom of the chamber $m$ and the top and bottom of the ice-receptacle. $o\ o$ are orifices for the reception of bottles, which rest on the bottom of the chamber $m$. $n$ is the cover of the ice-receptacle.

The operation of my apparatus is as follows: Beer, or other liquids to be cooled, is introduced into the inclined beer-receptacle $f$ through the induction-pipe $i$, at its enlarged end $d$, and is drawn out, as desired, through the eduction-pipe when cooled by the water flowing through the perforations in the bottom of the ice-plate, the water thus entirely surrounding the beer-receptacle, while, by the construction, water can be also drawn, when desired, from the pipe $p$, thus rendering the apparatus a combined beer and water cooler. The liquids contained in the bottles introduced into the orifices $o\ o$ are cooled by the ice in its receptacle.

The outer surface of the apparatus is preferably covered with gum cloth or other non-conducting material, and is provided with suitable handles. The induction and eduction pipes are made in sections, and the upper part of the induction-pipe may be removed and the hose of a pump applied to the lower section, to fill the beer-receptacle.

It is obvious that, by making the vessel $a$ larger, several receptacles for beer, ale, or other beverages, may be employed. A lid is preferably placed on the enlarged end $d$ of the induction-pipe.

I claim as my invention—

1. The vessel $a$, provided with the slots $c$ $c'$ and projections $b$ $b'$, of unequal height in its bottom, and pipe $p$, in combination with the inclined receptacle $f$, having the induction and eduction pipes $i$ and $e$, substantially as described, and for the purpose set forth.

2. The vessel $a$, constructed as set forth, and inclined beer-receptacle $f$, having induction and eduction pipes $i$ and $e$, in combination with the ice-receptacle N, provided with a perforated bottom, substantially as described, and for the purpose set forth.

MARY NICHOLSON.

Witnesses:
E. A. ELLSWORTH,
MELVILLE CHURCH.